United States Patent [19]

Akashi et al.

[11] Patent Number: 4,803,507

[45] Date of Patent: Feb. 7, 1989

[54] AUTOMATIC FOCUSING DEVICE

[75] Inventors: Akira Akashi; Masanori Yamada, both of Kanagawa, Japan

[73] Assignee: Canon Kabushiki Kaisha, Japan

[21] Appl. No.: 783,056

[22] Filed: Oct. 1, 1985

Related U.S. Application Data

[63] Continuation of Ser. No. 696,878, Jan. 31, 1985, abandoned, which is a continuation of Ser. No. 558,768, Dec. 6, 1983, abandoned.

[30] Foreign Application Priority Data

Dec. 7, 1982 [JP] Japan .................................. 57-214405
Jan. 26, 1983 [JP] Japan .................................... 58-11052

[51] Int. Cl.$^4$ ................................................ G03B 3/00
[52] U.S. Cl. ...................................... 354/400; 354/403
[58] Field of Search ............... 354/403, 415, 126, 400, 354/402; 352/140; 250/201 AF

[56] References Cited

U.S. PATENT DOCUMENTS

| 3,442,193 | 5/1969 | Pagel | 354/403 |
| 4,410,261 | 10/1983 | Masunaga et al. | 354/25 X |
| 4,531,157 | 7/1985 | Ishikawa | 354/400 |
| 4,542,970 | 9/1985 | Suzuki et al. | 354/403 |

FOREIGN PATENT DOCUMENTS 55152519  4/1979  Japan .................................. 354/403

Primary Examiner—W. B. Perkey
Attorney, Agent, or Firm—Toren, McGeady & Associates

[57] ABSTRACT

The disclosed automatic focusing device measures distances by repeatedly illuminating an object to the photographed with an auxiliary light. Upon detection of an in-focus state, either the auxiliary light illumination is inhibited or the auxiliary light driving cycle is made longer than the cycle used in a de-focus condition, so that the waste of electric energy is minimized.

13 Claims, 6 Drawing Sheets

F I G. 4 (a)
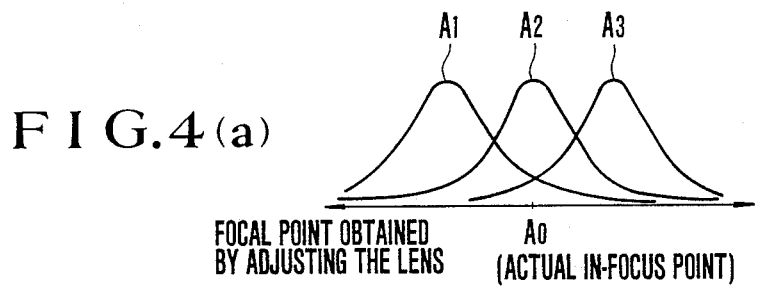
F I G. 4 (b)
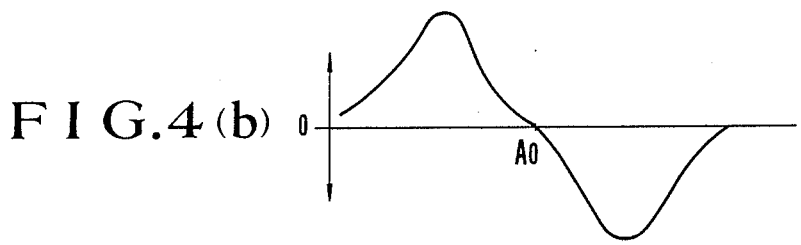
F I G. 4 (c)
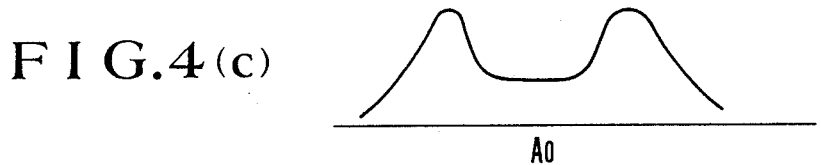
F I G. 4 (d)
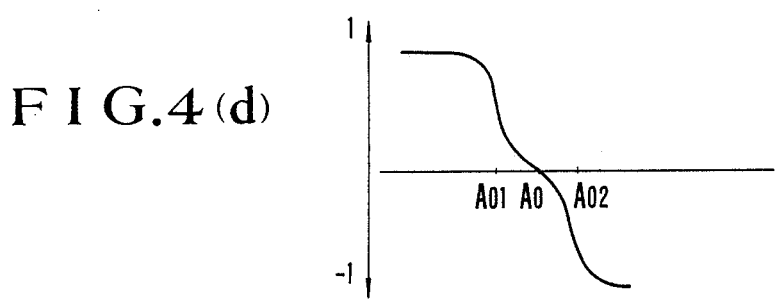

AUTOMATIC FOCUSING DEVICE

This is a continuation of application Ser. No. 696,878, filed Jan. 31, 1985, now abandoned which in turn is a continuation application of Ser. No. 558,768, filed Dec. 6, 1983, now abandoned.

BACKGROUND OF THE INVENTION

1. Field of the Invention

This invention relates to an automatic focusing device in which distances are measures by an auxiliary light illuminating an object to be photographed and in which a lens is shifted to an in-focus position by driving the lens according to the distances measured.

2. Description of the Prior Art

In order to keep a lens in focus while following a moving object to be photographed, an automatic focusing device must be arranged to repeat its distance measuring action at predetermined intervals.

An ideal automatic focusing device is preferably usable under any condition. Actually, however, it becomes impossible to compute a focusing condition when an object to be photographed is excessively dim. To solve this problem, one may arrange for an auxiliary light source to emit light every time an image signal is received, i.e., at every distance measuring action.

Normally, once an in-focus state attained, a focusing action is not required until the object move. After the in-focus state is obtained, therefore, it is possible either to stop emission of the auxiliary light or to extend the interval between one distance measuring action and another. Conventional devices are arranged to measure the distances after the lenses are in-focus at the same interval as before the lenses attain the in-focus state. Accordingly, the auxiliary light source consumes excessing electric energy.

SUMMARY OF THE INVENTION

It is therefore an object of the present invention to provide an automatic focusing device which is arranged to have an auxiliary light repeatedly emitted for a distance measuring action before an in-focus state is attained and to bring both the distance measuring action and the emission of the auxiliary light to a stop after attainment of the in-focus state so as to minimize the consumption of electric energy and solve the above-stated problem of the prior art device.

It is another object of the invention to provide an automatic focusing device which is arranged to make the length of repeating intervals of distance measurement and auxiliary light emission longer after attainment of an in-focus state than before attainment thereof, so that consumption of electric energy can be lessened to solve the above-stated problem of the prior art devices.

These and further objects and features of the invention will become apparent from the following detailed description of the preferred embodiments thereof taken in connection with the accompanying drawings.

BRIEF DESCRIPTION OF THE DRAWINGS

FIGS. 4(a), (b), (c) and (d) are illustrations of the operation of the computing circuit of FIG. 3.

DETAILED DESCRIPTION OF THE PREFERRED EMBODIMENTS

Figure 1:
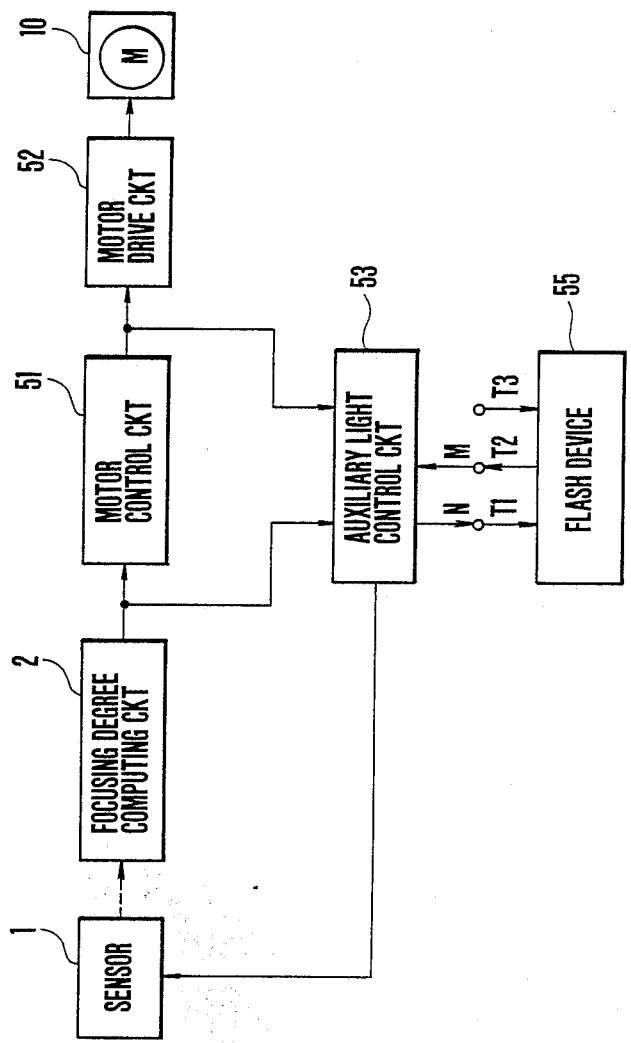
FIG. 1 is a block diagram showing an automatic focusing device as an embodiment of the present invention.

FIG. 1 is a block diagram showing the system arrangement of an automatic focusing device according to the present invention. The arrangement and operation of the device as shown in FIG. 1 are as follows: A sensor 1 is a storage type self-scanning element (CCD) and is positioned on a focal plane. The sensor 1 begins to accumulate an image signal in response to a signal from an auxiliary light control circuit 53. When the accumulation has been performed over a predetermined period of time, the image signal thus accumulated is serially transferred to a focusing degree computing circuit 2. In the drawing, a broken line represents the serial image signal. Upon receipt of the image signal, the focusing degree computing circuit 2 determines whether the signal represents a near-focus, in-focus or far-focus state and, at the same time, quantitatively computes a defocus degree. Distance measurement information thus obtained is supplied to a motor control circuit 51. Hereinafter, the above-stated series of actions for obtaining distance measurement information will be called a distance measuring action. The motor control circuit 51 controls a driving action on a motor 10 on the basis of the distance measurement information received. Under this control, a lens (not shown) is shifted by the motor 10 to a correct position in which an in-focus state is attainable.

The above-stated series of actions including the distance measuring action and the lens driving action are repeated to adjust the position of the lens in pursuit of an in-focus state even when the object to be photographed is moving, so that the lens can be kept in an in-focus position.

The above-stated operation of the embodiment applies only to the conditions under which the focusing degree is detectable. In performing distance measurement, either the imaging state of the sensor would become excessively blurred or the contrast of the object image would become excessively low (low contrast) if the lens were in a position deviating excessively from an in-focus position. In that event, the accuracy of the result of the focusing degree computation which is performed by the focusing degree computing circuit 2 on the basis of the output of the sensor 1 is degraded in accuracy to a great degree and a distance measurement is hardly possible. When a distance is unmeasureable, i.e. when the lens position is outside of a distance measureable range and excessively deviates from an in-focus position, the operation described in the foregoing is changed as follows: The motor control circuit 51 causes the motor to shift the lens a predetermined extent. Then, the distance measurement is again performed with the lens in the new position. If, despite of that, the distance measurement is still impossible, the lens is again shifted the predetermined extent. Hereinafter, this process is called a search action.

Under an excessively blurred or low contrast condition, the search action is repeated in this manner to bring the lens closer to the in-focus point by repeatedly shifting it to the predetermined extent at a time. After the lens has thus been shifted from a unmeasureable distance range to a measureable distance range, the embodiment operates in the manner described in the foregoing to automatically bring the lens into an in-focus position.

The above-stated unmeasureable distance condition arises not only when the lens is excessively de-focused but also arises when the brightness of an object to be photographed drops (low brightness). In the latter case, distance measurable condition can never be attained by repeating the search action to shift the lens to predetermined extent each time unless the brightness increases. To solve this problem, the embodiment has arranged a flash device 55 connected thereto as an auxiliary light source which is arranged to illuminate the object to be photographed. Again referring to the block diagram, a charge completion signal which is produced by the flash device 55 upon completion of a charging process its main capacitor is supplied from a terminal T2 to a terminal M. Upon receipt of this signal, an auxiliary light control circuit 53 causes the sensor 1 to perform an accumulating action in synchronism with the charge completion signal. Meanwhile, an auxiliary light emission signal is supplied from a terminal N to a terminal T1 to operate the flash device 55 and illuminate the object. Therefore, the object can be illuminated in synchronism with a distance measuring action, so that the above-stated problem relative to low brightness can be solved. The embodiment is thus capable of shifting the lens to an in-focus position even under a low brightness condition.

Further, during the use of the above-stated auxiliary light in accordance with the invention, an in-focus signal is supplied to the auxiliary light control circuit 53 when an in-focus state is detected by the focusing degree computing circuit. With this signal received, the control circuit 53 stops the sensor 1 from performing the accumulating action, in a manner called a one-shot mode, and also stops the emission of the auxiliary light. In other words, once an in-focus state is attained, the auxiliary light is no longer emitted and the sensor 1 ceases preforming the accumulating action (or a distance measuring action) even when the above-stated charge completion signal is supplied to the auxiliary light control circuit. This arrangement contributes to reduction in power consumption.

Figure 2:
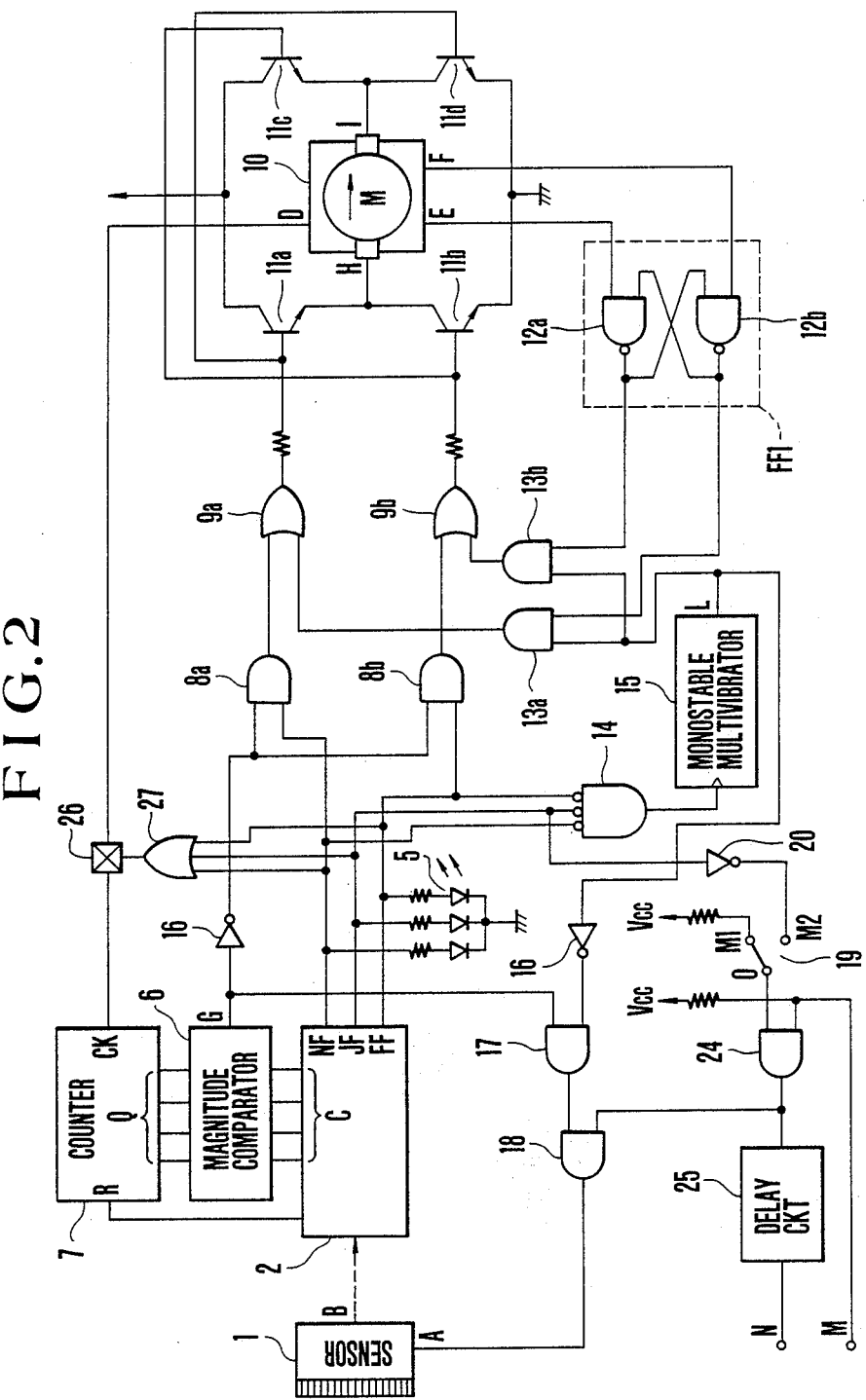
FIG. 2 is a circuit diagram showing by way of example the circuit arrangement of the embodiment of the invention.

An example of the circuit arrangement of the focusing device according to the present invention is shown in FIG. 2. The circuit arrangement includes a sensor 1 which is a storage type self-scanning element (CCD line sensor) and is disposed in a position equivalent to a focal plane in the optical path of a photo-taking lens. The sensor 1 begins to accumulate an electric charge when a signal A is at a high level (hereinafter called H level). After the electric charge has been accumulated for a predetermined period of time, the sensor 1 produces an image signal serially from its output terminal B. In the drawing, a broken line represents this serial signal. A focusing degree (i.e., the focusing condition or focus) computing circuit 2 computes a focusing degree on the basis of the image signal serially supplied from the sensor 1. If the result of computation indicates a near focus state, the level of an output NF of the circuit 2 becomes high. If it is an in-focus state, an output JF of the circuit 2 becomes high. If it is a far-focus state, another output FF of the circuit 2 becomes high. In the event that the focusing state cannot be determined due to an excessive de-focus degree, etc., the levels of all the outputs of the circuit 2 go to a low level (hereinafter called L level for short). A reference numeral 5 denotes a display device consisting of light emitting diodes or the like. The circuit 2 also quantitatively computes a de-focus degree (i.e., extend of de-focus or the de-focus). At the output terminals C the circuit 2 produces a digital value corresponding to the degree of de-focus, i.e. a lens shifting extent required for shifting the lens to an in-focus position. In the event that the focusing state is undetectable, the levels of all the outputs from the terminals C assume an L level. The computing circuit 2 and the sensor 1 together form a distance measuring circuit.

A counter 7 is arranged to receive a pulse signal D as a clock input via an analog switch 26 from a member (not shown) arranged at a lens shifting motor 10 to produce a pulse signal, consisting of a number of pulses corresponding to the extent of a lens shift. A magnitude comparator 6 is arranged to receive the de-focus degree digital signal C of the focusing degree computing circuit 2 and the output Q of the lens shifting extent counter 7. The comparator 6 makes the level of the output G thereof high when the two inputs coincide with each other and makes it low when they do not. The reset terminal R of the counter 7 is connected to the focusing degree computing circuit 2. Upon completion of computation by the computing circuit 2, an H level signal is impressed on the reset terminal R to reset the counter 7. AND circuits 8a and 8b and OR circuits 9a and 9b together form a drive control circuit which supplies a drive control signal to the motor 10. A motor drive circuit which controls the normal or reverse rotation of the motor 10 is formed by transistors 11a–11d. The drive circuit drives the motor on the basis of the above-stated drive control signal.

A NOR circuit 14 is arranged to produce an H level output to actuate a searching function when computation of the focusing degree is impossible, that is, when the levels of all the outputs NF, JF and FF of the focusing degree computing circuit 2 are low. The NOR circuit 14 thus forms a searching function selection circuit.

A monostable multivibrator 15 is arranged to produce an H level signal for a predetermined period of time when an input thereof rises, i.e. when the searching function is selected. The multivibrator 15 is arranged to be irresponsive to an input signal received when the power supply is switched on. The above-stated predetermined period of time is of a length required for lens shifting by each performance of a search action. The output terminal L of the monostable multivibrator 15 is connected to AND circuits 13a and 13b and further to the motor drive circuit via the OR circuits 9a and 9b. Meanwhile, other input terminals of the AND circuits 13a and 13b are connected to the output terminals of a flip-flop circuit FF1 which consists of NAND circuits 12a and 12b. The input terminals of the flip-flop circuit FF1 for input signals E and F are connected to an end detecting member (not shown) arranged either at the motor or at the lens. This member is composed of either a sensor or a switch or the like and is arranged to make the level of either the signal E or F low (L) when the lens arrives at either an infinity distance position or a nearest distance position and to make the levels of both the signals E and F high (H) when the lens is in any other positions. When the level of either the signal E or the signal F becomes an L level, the outputs of the flip-flop FF1 are inverted. Then, the AND circuits 13a and 13b which are arranged to receive the outputs shift the transmission of the output signal L of the monostable multivibrator 15 to the OR circuit 9a or to the other OR circuit 9b.

Accordingly, in case the focusing degree computation is impossible, a search action is performed by driving the motor in one of the two directions for a period of time during which the output of the monostable multivibrator 15 remains at an H level. When the lens is shifted to one end position, the end detecting member inverts the flip-flop FF1. Then, the direction of power supply to the motor is reversed and the lens is shifted in the reverse direction from the above-stated end position. A search control circuit is formed by the above-stated monostable multivibrator 15 and the AND circuits 13a and 13b. There is provided another AND circuit 17 which has one input terminal thereof connected to the output terminal G of the comparator 6 and the other input terminal thereof to the monostable multivibrator 15 via an inverter 16. The AND circuit 17 is arranged to produce an L level output while the lens is being shifted and to produce an H level output upon completion of lens shifting.

The embodiment includes a mode selection switch 19. When the switch 19 is shifted to one side M1 (a position for a first auxiliary light mode), an AND circuit 24 produces an H level output and an AND circuit 18 also produces an H level output as distance measurement signal in response to an H level charge completion signal of the flash device received from a terminal M. This distance measurement signal then causes the sensor 1 to begin its accumulating action.

The H level output of the AND circuit 24 actuates a delay circuit 25 which then produces an H level output after the lapse of a predetermined period of time. This output is supplied via a terminal N to the flash device to cause the flash device to begin a flashing action. Therefore, with the switch 19 shifted to the side M1, a distance measuring action is performed and the object to be photographed is illuminated with an auxiliary light every time a charge completion signal is produced from the flash device. The switch 19 is provided with another terminal M2 for selection of a second auxiliary light mode according to the invention. The output JF of the focusing degree computing circuit 2 is impressed via an inverter 20 on this terminal M2. Therefore, when an in-focus state is obtained in the second auxiliary light mode, the output level of the inverter 20 becomes low and that of the AND circuit 24 also becomes low. When there obtains a de-focus state in the second auxiliary light mode, the gate of the AND circuit or gate 24 is open and the terminal M2 always has an H level input impressed thereon under that condition. As a result, a distance measuring action and emission of the auxiliary light are performed at the same timing as in the case of the above-stated first auxiliary light mode.

Figure 3:
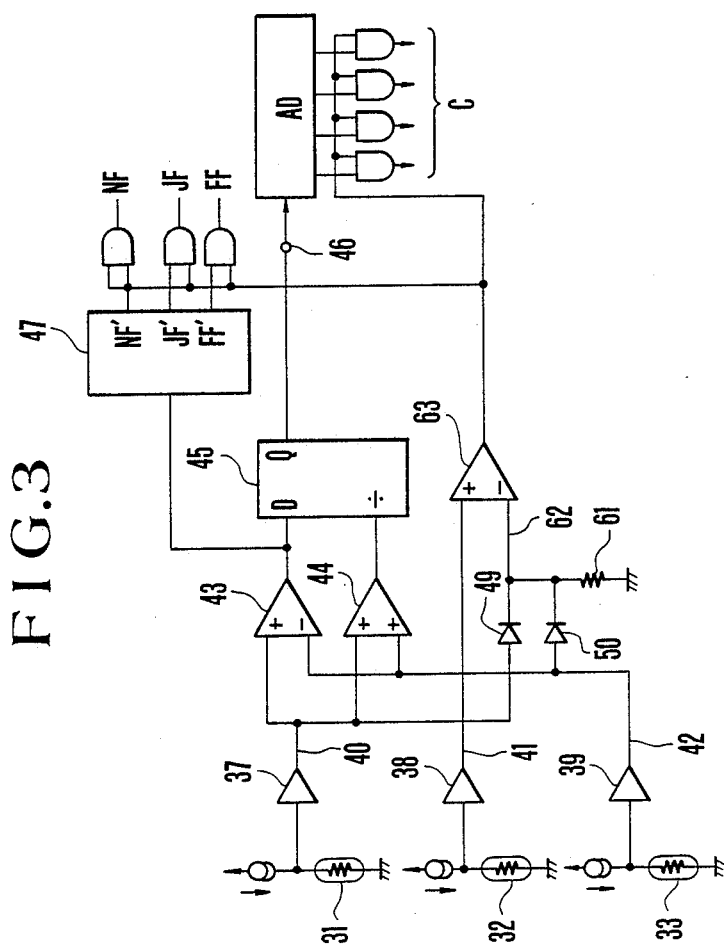
FIG. 3 is a circuit diagram showing by way of example the details of a sensor 1 and a computing circuit 2 included in FIG. 2.

FIG. 3 is a circuit diagram showing by way of example the details of the sensor 1 and the focusing degree computing circuit 2 shown in FIG. 2. The sensor 1 consists of three sensor elements 31, 32 and 33. The sensor element 32 is disposed in a position equivalent to a focal plane. The sensor element 31 is disposed in a position equivalent to a near-focus plane located in front of the focal plane and the sensor element 33 in a position equivalent to a far-focus plane located in the rear of the focal plane. With the sensor elements arranged in this manner, the outputs of the sensor 1 which are sharpness signals and are produced from these different positions of sensor elements are amplified by amplifiers 37, 38 and 39 respectively. Thus, signals representative of image sharpness obtained in front of an expected focal plane, on the expected focal plane and in rear of the expected focal plane are produced to lines 40, 41 and 42 respectively. The signals of lines 40 and 42 are supplied to a differential amplifier 43 to obtain a difference in sharpness between two images obtained in front and in rear of the expected imaging plane. At the same time, the sum of image sharpness degrees obtained in front and in rear of the expected imaging plane is obtained by an addition amplifier 44. The outputs of the amplifiers 43 and 44 are then supplied to a divider 45. The divider 45 divides the difference thus obtained by the sum thus obtained to determine the sharpness of the object image. The divider 45 then produces a signal representing a de-focus degree to a terminal 46. More specifically, referring to FIG. 4(a), let us assume that the output (a sharpness signal) of the line 41 is changing as represented by a wave form A1, that of the line 40 as represented by a wave form A2 and that of the line 42 as represented by another wave form A3. Since the amplifier 43 is arranged to obtain the difference between the outputs of the lines 40 and 42 as mentioned above, a resultant difference signal becomes as shown in FIG. 4(b). The amplifier 44 on the other hand is arranged to obtain the sum of the outputs of the lines 40 and 42. A resultant sum thus obtained becomes as shown in FIG. 4(c). With the value of the wave form of FIG. 4(b) divided by the value of the wave form of FIG. 4(c), therefore, the output of the divider 45 becomes as shown in FIG. 4(d). As apparent from the wave form of FIG. 4(d), this output of the divider 45 is a functional signal which shows a minimum value at an in-focus point A0 and increases (in absolute value) according as the extent of deviation from the in-focus point increases. The output of the divider 45 thus permits computation of the de-focus degree from the in-focus point and the computed value thus obtained is digitized by an A–D converter.

The output of the above-stated amplifier 43 is supplied to a window comparator 47 to have the focusing direction detected thereby. In other words, when the level of the output of the line 40 is higher than the output level of the line 42, an imaging state obtains at a point before the in-focus point. Therefore, when the sharpness obtained at a position in front of the in-focus point, i.e. in the region on the left side of the in-focus point A0 as viewed on FIG. 4(a), is higher than the sharpness obtained at the in-focus point, the amplifier 43 produces a positive output as shown in FIG. 4(b). In that instance, therefore, the window comparator 47 produces a high level output from the terminal NF' thereof. The high level output from the terminal NF' instructs that the lens be shifted from a near-focus position (a state having the object image formed in front of the in-focus point) toward a far-focus position (a state having the image formed in rear of the in-focus point). Conversely, when the output level of the line 40 is lower than that of the line 42, i.e. when the imaging state obtains within a region on the right side of the in-focus point A0 as viewed on FIG. 4(a), the amplifier 43 produces a negative signal as shown in FIG. 4(b). In this instance, the window comparator 47 produces a high level output from the terminal FF' thereof to instruct that the lens be shifted from a far-focus position toward a near-focus position. Further, when the output of the amplifier 43 becomes nearly zero, the window comparator 43 produces a high level output from the terminal JF' thereof. The focusing direction and the de-focus degree are both detected in this manner. In the event that the imaging point is not at any internally dividing points of the front and rear sensor elements 31 and 33, the de-focus degree to be produced from the terminal 46 cannot be accurately obtained. Besides, if the whole image is blurred to an excessive degree, a de-focus state can hardly be determined. To solve this problem, diodes 49 and 50 and a resistor 61 are arranged to obtain one of the sharpness signals from the lines 40 and 42 having a high level than the other and to produce it to a line 62. This signal of line 62 is compared at a comparator 63 with the signal from the line 41, i.e. the sharpness signal of the expected focal plane. Then, if the sharpness at the expected focal plane is found higher than the sharpness at a plane in front or rear of the expected focal plane, with the imaging plane within the range of the internally dividing points of sensor elements 31 and 33, that is, when the de-focus degree obtained at the above-stated terminal 46 is an accurate value (an established value), a high level output is produced from the comparator 63. As shown in FIG. 4(d), the de-focus degree can be obtained as function at a point in the neighborhood of the in-focus point A0. However, when the de-focus degree exceeds a certain given deviation degree from the in-focus point in the region either on the left or right side of the in-focus point as shown in FIG. 4(d), the signal representing the de-focus degree is no longer obtainable as an accurate function. Therefore, the comparator 63 is arranged to compare the output of the line 41 (represented by A1 in FIG. 4(a)) with the outputs of lines 40 and 42 (represented by A2 and A3 in FIG. 4(a)). When the signal is within the range between A01 and A02 as shown in FIG. 4(d), the comparator 63 produces a high level output to indicate that the de-focus degree signal produced from the above-stated terminal 46 is of an accurate value. In any event other than that, the output level of the comparator 63 becomes low. The low level signal thus produced from the comparator 63 is supplied to AND gates arranged at the output terminals of the window comparator 47 and those of an A–D converter AD to make the levels of their outputs low.

Figure 5:
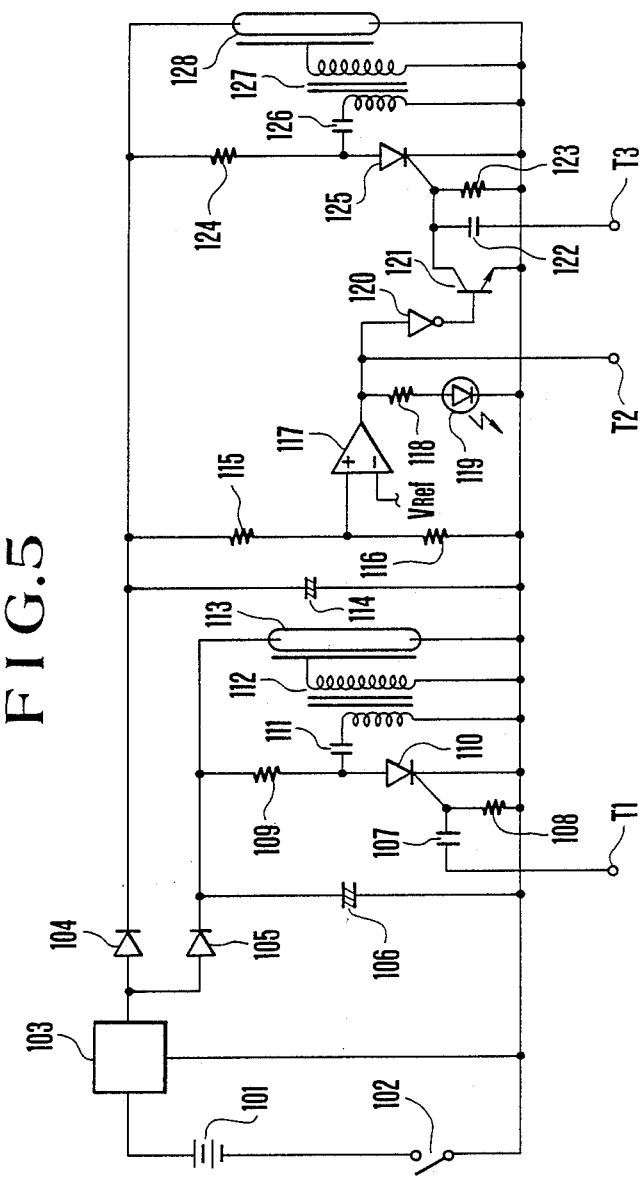
FIG. 5 is a circuit diagram showing by way of example an auxiliary light source to be used for the automatic focusing device of FIG. 2.

FIG. 5 is a circuit diagram showing by way of example the circuit arrangement of a flash device to be used as the auxiliary light source of the focusing device according to the invention. The circuit diagram includes a power source battery 101, which is connected to a known booster circuit 103 via a power source switch 102. Elements 106–113 form a light emitting circuit which generates an auxiliary light for distance measurement. The auxiliary light emitting circuit includes a flash energy accumulating capacitor 106 which is connected to the cathode of a rectifying diode 105 connected to the output terminal of the booster circuit 103; a capacitor 107 connected to the gate of a thyristor 110 of a trigger circuit which will be described later herein; a resistor 108 which forms a differentiation circuit together with the above-stated capacitor 107; a charging resistor 109 which is series connected to a trigger capacitor 111; a trigger transformer 112 which forms a trigger circuit together with the above-stated elements 109, 110 and 111; and a discharge tube 113 which has its main electrode parallel connected to the above-stated capacitor 106 and its trigger electrode to the secondary winding of the trigger transformer 112. A capacitor 114 is arranged to accumulate a flash energy for illuminating an object to be photographed. The capacitor 114 is connected to the output terminal of the booster 103 via a rectifying capacitor 104. A charge level detecting circuit is formed by elements 115–117 including: Resistors 115 and 116 which are parallel connected to the capacitor 114 and form a voltage dividing circuit; and a comparator 117 which has its positive input terminal connected to the output terminal of the voltage dividing circuit and is arranged to change the level of its output to an H level when the charge level of the capacitor 114 reaches a sufficient voltage level for causing a discharge tube 128 to flash. The negative input terminal of the comparator 117 is connected to a power source (not shown) which has a reference voltage impressed thereon. The flash device further includes a charge completion displaying light emitting diode 119 which is arranged to have a driving voltage impressed thereon via a current limiting resistor 118 when the output level of the comparator 117 changes. An npn transistor 121 is connected to the output terminal of the comparator 117 via an inverter 120. The part between the emitter and collector of the transistor 121 is parallel connected to a resistor 123 for the purpose of keeping a thyristor 125 inoperative before completion of a charging process on the capacitor 114. A capacitor 122 is arranged to transmit a flashing start signal (a synchronizing switch on signal) to the thyristor 125 via a terminal T3. A charging resistor 124 is provided for a trigger capacitor 126. A trigger transformer 127 is arranged to generate a trigger voltage from its secondary winding when the thyristor 125 becomes conductive. The discharge tube 128 is parallel connected with the main flashing capacitor 114.

The embodiment which is arranged as shown in FIG. 2 operates as follows: The operation in the second auxiliary light mode which relates to the present invention will be explained in the first place. Let us assume that the flash device of FIG. 5 is connected to the focusing device of FIG. 2 and that the switch 102 of FIG. 5 is on. Under that condition, the switch 19 is shifted to the side M2 and a power source switch (not shown) is turned on to effect power supply to the focusing device. With the power supply thus switched on, the counter 7 is reset and the focusing degree computing circuit 2 is cleared by means of a power-up-clear circuit (not shown), etc. The output Q of the counter and the output C of the computing circuit 2 are coinciding with each other and the levels of all their outputs are low. Therefore, the output G of the comparator 6 is at an H level i.e. high. The monostable multivibrator 15 is inoperative at the time when the power source is switched on. Therefore, the output of the inverter 16 is at an H level i.e. high. With the power source switched on, therefore, the AND circuit 17 produces an H level output. At the flash device of FIG. 5 on the other hand, the switch 102 is on as mentioned above. The capacitors 106 and 114 are thus charging. When the charge levels of these capacitors come to exceed predetermined values, the comparator 117 produces an H level output. The H level i.e. high output is transmitted via the terminal T2 to the terminal M of FIG. 2 as a charge completion signal.

Since the computing circuit 2 is cleared in the initial stage as mentioned in the foregoing, the output JF of the circuit 2 is at an L level. Therefore, the inverter 20 produces an H level output and supplies it to one of the input terminals of the AND gate 24. Meanwhile, the charge completion signal is supplied via terminal M to the other input terminal of the AND gate 24. Therefore, in response to the charge completion signal, the AND gate (or circuit) 24 produces an H level output, which is transmitted to the AND circuit 18. Since the AND circuit 17 is producing an H level output as mentioned above, the AND circuit 18 produces an H level output in response to the H level output of the AND circuit 24. The H level output of the AND circuit 18 the causes the sensor 1 to begin to accumulate an image signal there. After that, the image signal accumulated at the sensor 1 is transferred to the computing circuit 2.

Further, the H level output of the AND circuit 24 is transferred to the delay circuit 25. Then, after the lapse of a predetermined short time, the delay circuit 25 produces an H level output. This output is transmitted via the terminal N to the terminal T1 which is shown in FIG. 5. Upon arrival of this H level output of the delay circuit 25, the thyristor 110 turns on to cause the capacitor 111 to discharge the electric charge thereof. This triggers the discharge tube 113 to cause it to flash. As a result of that, the accumulating action by the sensor 1, i.e. a distance measuring action, is performed under illumination with the auxiliary light. With the distance measuring action performed under the auxiliary light illumination, the computing circuit 2 performs computation to detect a near-focus state, a far-focus state or in-focus state on the basis of the image signal received from the sensor 1. The computing circuit 2, at the same time, also detects a de-focus degree and produces the output C in a digital value corresponding to the de-focus degree.

Let us now assume that the lens position is within a distance measureable range to permit distance measurement. Under this condition, the computing circuit 2 produces one of the outputs NF, JF and FF at an H level according to the result of distance measurement and also produces the output C representing the value of the de-focus degree as mentioned above. In the near-focus state, the output NF is produced at an H level i.e. high and is supplied to the AND gate 8a. Meanwhile, the counter 7 has been again reset when the computation by the computing circuit 2 is completed. Therefore, there obtains a relation: Output C>Output Q. Therefore, the comparator 6 has its output G at an L level i.e. low.

Accordingly, the output level of the inverter 16 goes high. Since this H level output of the inverter 16 is supplied to the other input terminal of the AND gate 8a, the AND gate 8a produces an H level output. The H level output of the AND gate 8a turns the transistors 11a and 11d on. The motor 10 rotates in the direction of arrow to shift the lens toward a far-focus position. The analog switch 26 turns on in response to the H level output NF supplied thereto via an OR circuit 27. Therefore, when a number of pulses corresponding to the extent to which the lens is shifted by the rotation of the motor 10 are produced from the terminal D, the counter 7 counts the pulses. When the lens comes to an in-focus position after having been shifted from the near-focus position toward a far-focus position, the count value of the counter 7 coincides with the digital value of the output C of the computing circuit 2. The comparator 6, therefore, produces the output G at an H level. The H level output G then turns the output level of the AND circuit 8a into an L level. The driving operation on the motor 10 by the transistors 11a and 11d is brought to a stop. The lens, therefore, ceases to be driven by the motor when it comes to the in-focus position. With the lens driving action coming to an end, the level of the output G of the comparator 6 becomes high as mentioned in the foregoing. The AND circuit 17, therefore, again produces an H level output. However, since the output JF of the computing circuit 2 is at an H level, the output of the AND circuit 24 is at an L level. Therefore, the output level of the AND circuit 18 also becomes low to bring the image signal accumulating action of the sensor 1 to a stop. The discharge tube 113 also ceases to flash.

In the second auxiliary light mode, as described above, the flash light emitting action and the distance measuring action are no longer performed after an in-focus state is attained and even when a charge completion signal is produced after attainment of the in-focus state. This effectively prevents the electric energy from being wasted by a useless flashing action.

The operation in the near-focus state is as described above. When a far-focus state is detected via distance measurement, the level of the output FF of the computing circuit 2 becomes high. Therefore, in that instance, the AND circuit 8b produces an H level output. The transistors 11c and 11d turn on to cause the motor to rotate in the direction reverse to the rotating direction for the above-stated near-focus state. After that, the lens is driven to an in-focus position in the same manner as in the case of the near-focus state. The level of the output JF of the computing circuit 2 then becomes an H level. The image signal accumulating action of the sensor 1 comes to a stop and the discharge tube 113 ceases to flash.

Further, in the above-stated second auxiliary light mode, if there obtains a distance unmeasureable condition with the lens position within a distance unmeasure-able range, the embodiment operates as follows: In this instance, as a result of distance measurement performed under auxiliary light illumination with a flash light emitted in response to a charge completion signal, the computing circuit 2 produces its outputs NF, JF and FF at an L level and its output C also at an L level.

The outputs of the AND circuits 8a and 8b are, therefore, kept at an L level. The NOR circuit 14 on the other hand produces an H level output to render the monostable multivibrator 15 operative. The level of the output L of the monostable multivibrator 15 thus comes to remain at an H level for a predetermined period of time. This H level output L then causes one of the AND circuits 13a and 13b to produce an H level output. The motor 10, therefore, is driven either in the direction of arrow or in the direction reverse to the arrow while the output of the monostable multivibrator 15 stays at the H level. The motor thus shifts the lens to a predetermined extent. After the lens is thus shifted the predetermined extent, the AND circuit 13a or 13b comes to produce an L level output to stop the motor 10 from driving the lens when the level of the output of the multivibrator 15 becomes an L level. Then, the AND circuit 17 again has an H level signal impressed on one of the input terminals via the inverter 16.

Further, since all the terminals NF, JF and FF of the computing circuit 2 are producing L level outputs in this instance, the analog switch 26 is in an open state. Accordingly, the counter is kept in its initial state despite of the shift of the lens to the predetermined extent. As a result of that, the level of the output G of the comparator 6 is kept at an H level irrespective of the shift of the lens. Accordingly, with the output level of the mono-stable multivibrator 15 becoming low, the AND circuit 17 produces an H level output. Then, since the output JF is at an L level as mentioned above, the output of the inverter 20 is at an H level. The AND circuit 24, therefore, produces an H level output in response to the charge completion signal. This causes the AND circuit 18 to produce an H level output. The H level output of the AND circuit 18 in turn causes the sensor 1 to resume its image accumulating action. Following this, the distance measurement and the lens driving action shift it to the predetermined extent is repeatedly carried out under the flash light illumination every time the charge completion signal is produced until the lens is shifted to a distance measurable range. The search action is thus accomplished in this manner when the lens is within a distance unmeasurable range.

During the search action, when the lens is shifted and reaches a distance measurable range closer to the in-focus position, it becomes possible to detect through the distance measurement, whether the lens is in a near-focus state, an in-focus state or a far-focus state together with the de-focus degree. After that, the lens is shifted to an in-focus position in the same manner as described in detail in the foregoing concerning the operation under the distance measureable conditions.

Once the lens reaches the in-focus position, the flash action and the distance measuring action are no longer performed even when a charge completion signal is produced. Therefore, the electric energy can be saved from being wasted by unnecessary actions. Auxiliary light mode is as follows: In this case, the switch 19 is shifted to the side M1. This brings the AND circuit 24 into a state of producing an H level output solely in response to a charge completion signal. Therefore, the above-stated distance measuring action and the flashing action come to be performed every time a charge completion signal is produced.

In the focusing device of FIG. 2 according to the invention, as has been described in the foregoing, the distance measuring action and the flash emitting action are allowed to be performed every time a charge completion signal is produced when the auxiliary light is used under a de-focus condition. Meanwhile, under an in-focus condition, the distance measuring action and the flash light emitting action are no longer allowed to be performed, so that power consumption by the flash device which is employed as the auxiliary light source can be reduced to a great extent.

While a flash device is used as an auxiliary light source in this specific embodiment, the flash device of course can be replaced with use of an ordinary spot light source as an auxiliary light source. In that instance, a trigger circuit may be arranged to trigger the auxiliary light source in a predetermined cycle; and the distance measuring action may be accomplished by driving the spot light by a signal from this trigger circuit in place of the above-stated charge completion signal.

Figure 6:
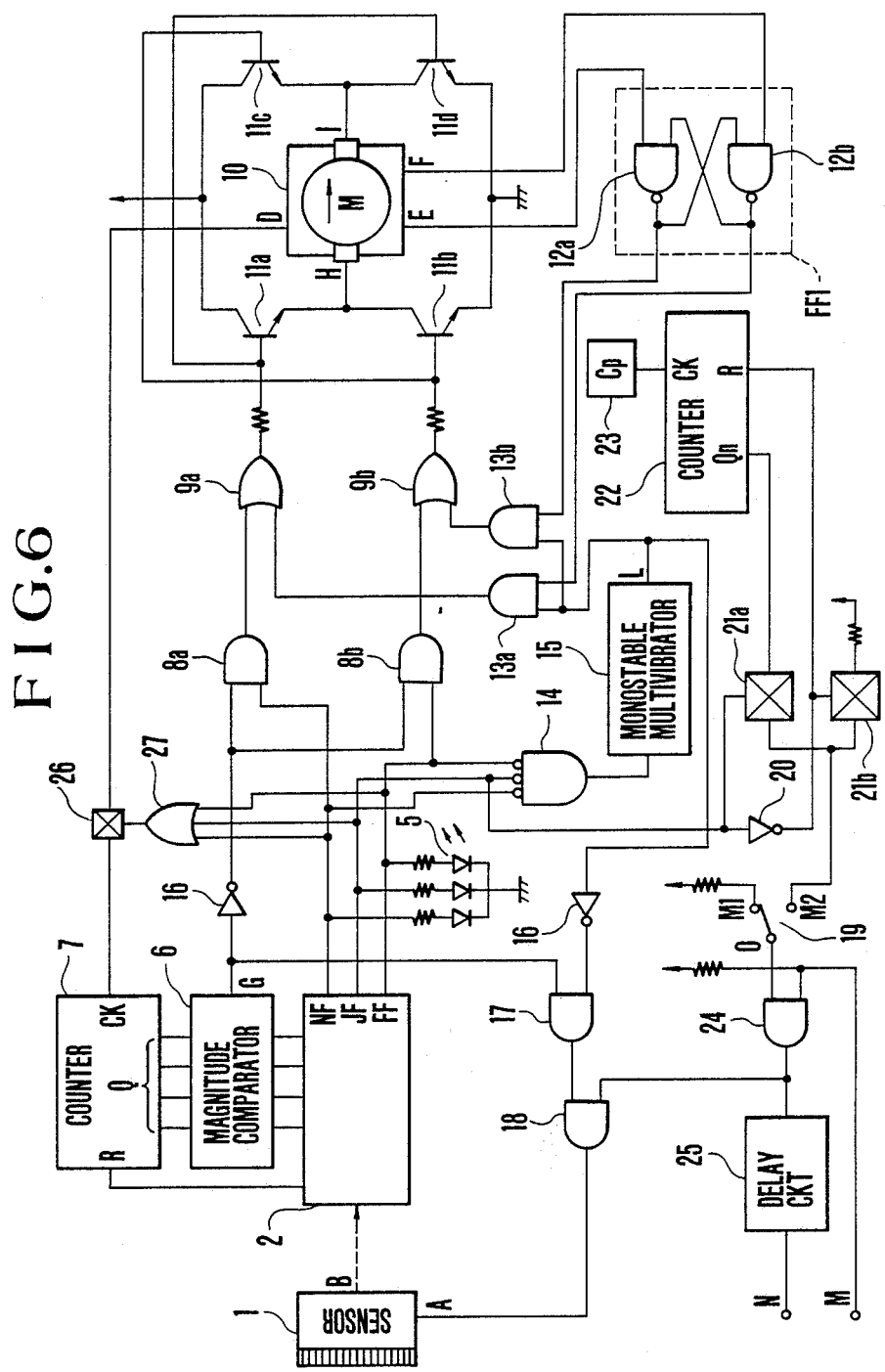
FIG. 6 is a circuit diagram showing an automatic focusing device as another embodiment of the invention.

FIG. 6 is a circuit diagram showing a focusing device as another embodiment of the present invention. In FIG. 6, the components and parts that are identical with those included in the preceding embodiment shown in FIG. 2 are indicated by the same reference numerals and symbols. The embodiment includes a clock pulse generating circuit 23 and a counter 22, which jointly form a timer circuit. The counter 22 produces an H level output from an output terminal Qn every time a predetermined number of pulses are counted. The output terminal Qn of the counter 22 is connected to a terminal M2 via an analog switch 21a. The analog switch 21a is connected to the output terminal JF of a computing circuit 2. The timer circuit and the switch 21a together form a control circuit which is arranged to control a distance measurement signal forming period in such a manner that the period becomes longer in the case of an in-focus state than in the case of a de-focus state with the analog switch 21a connected to the output terminal JF.

Another analog switch 21b is also connected to the output terminal JF of the computing circuit 2 via an inverter 20. The inverter 20 is connected to the reset terminal R of the counter 22. The counter becomes operative only in an in-focus state. The timer circuit and the switches 21a and 21b represent the point in which the embodiment differs from the preceding example of embodiment.

The embodiment arranged as shown in FIG. 6 operates as follows: Let us first describe a second auxiliary light mode of the embodiment. Let us assume that the flash device shown in FIG. 5 is connected to the focusing device of FIG. 6 and that the switch 102 shown in FIG. 5 is on. In the second auxiliary light mode, the switch 19 is connected to the side M2. A power source switch which is not shown is turned on to effect power supply to the focusing device. With the power source switched on, the counter 7 is reset by a power-up-clear circuit or the like (not shown) and the focusing degree computing circuit 2 is cleared.

Under this condition, the output Q of the counter 7 and the output C of the computing circuit 2 are coinciding with each other and all of them are at an L level. Therefore, the comparator 6 is producing the output G at an H level. Since the monostable multivibrator 15 is inoperative when the power source is switched on, the output of the inverter 16 is also at an H level. With the power source switched on, therefore, the AND circuit 17 produces an H level output.

Meanwhile, at the flash device shown in FIG. 5, since the switch 102 is on as mentioned above, the capacitors 106 and 114 are being charged. When the charge levels of these capacitors exceed predetermined values, the comparator 117 produces an H level output as a charge completion signal, which is transmitted to the terminal M shown in FIG. 6 via the terminal T2.

In the initial stage, since the computing circuit 2 is cleared as mentioned above, the output JF of the circuit 2 is at an L level. Accordingly, the inverter 20 produces an H level output, which is transmitted to the analog switch 21b to have the switch 21b in an open state. Therefore, the AND circuit 24 receives an H level input via the switch 21b at one of its input terminals. In the meantime, another H level input comes as the charge completion signal to the other input terminal of the AND circuit 24 via the terminal M. The AND circuit 24 thus produces an H level output in response to the charge completion signal. The H level output of the AND circuit 24 is transmitted to the AND circuit 18. Since the AND circuit 17 has been producing an H level output as mentioned above, the AND circuit 18 produces an H level output in response to the H level output of the AND circuit 24. The H level output of the AND circuit 18 then causes the sensor 1 to begin to accumulate an image signal. After that, the image signal accumulated by the sensor 1 is transferred to the computing circuit 2.

Meanwhile, the H level output of the AND circuit 24 is transmitted also to the delay circuit 25. After the lapse of a predetermined short period of time, the delay circuit produces an H level output, which is transferred to the terminal T1 shown in FIG. 3 via the terminal N. With the H level output transferred to the terminal T1, the thyristor 110 turns on. The capacitor 111 discharges the electric charge thereof to trigger the discharge tube 113 to emit a flash light. Then, the sensor 1 performs the accumulating action, i.e. a distance measuring action, under an auxiliary light illumination condition. With the distance measuring action performed under the auxiliary light illumination, the computing circuit 2 performs a computation to detect a near-focus state, a far-focus state or an in-focus state and also to produce at its output C, a digital value corresponding to a de-focus degree.

If the lens is within a distance measurable range to permit distance measurement, the computing circuit 2 produces one of the outputs NF, JF and FF at an H level according to the result of distance measurement under this condition. Also, the computing circuit 2 produces the output C representing a de-focus degree. If a near-focus state is detected as a result of distance measurement, for example, the terminal NF of the computing circuit 2 produces an H level output to the AND gate 8a. At the point of time when the computing circuit finishes its computation, the counter 7 has been again reset. Accordingly, the output C is at a higher level than the output Q. The comparator 6 thus produces the output G at an L level upon completion of the computation. Accordingly, the level of the output of the inverter 16 becomes high. The H level output of the inverter 16 is supplied to the other input terminal of the AND gate 8a. The AND gate 8a, therefore, produces an H level output, which turns on the transistors 11a and 11d to cause the motor 10 to rotate in the direction of arrow. The motor 10 thus shifts the lens toward a far-focus position. Further, the analog switch 26 turns on in response to the H level output NF supplied thereto via the OR circuit 27. Therefore, when a number of pulses corresponding to the extent to which the lens is shifted by the rotation of the motor 10 are produced from the output terminal D, the counter 7 counts the pulses. With the lens shifted from a near-focus state toward a far-focus state in this manner, when an in-focus state is attained, the count value of the counter 7 coincides with the digital value of the output C of the computing circuit 2. The level of the output G of the comparator 6, therefore, becomes high and the level of the output of the AND circuit 8a becomes low. The motor driving operation by the transistors 11a and 11d comes to a stop to bring the lens shifting action to an end when the lens is shifted to the in-focus position.

With the in-focus state obtained in this manner, the level of the output G of the comparator 6 becomes high and the AND circuit 17 again produces an H level output. Therefore, when a charge completion signal is received again from the terminal M, the AND circuit 24 again comes to produce an H level output. Then, the AND circuit 18 also produces an H level output to cause the sensor 1 to begin to accumulate an image signal. Concurrently with that, again a flash light is emitted to have distance measurement performed under auxiliary light illumination.

Then, if the object to be photographed remains in the same position as during the preceding performance of the distance measuring action, the computing circuit produces the output JF at an H level and all the output C at an L level as a result of the distance measurement. Therefore, the output G of the comparator 6 remains at an H level and the AND circuits 8a and 8b keep on producing L level outputs. The motor 10 is thus kept in an inoperative state. Meanwhile, with the level of the output JF becoming an H level, the level of the inverter 20 becomes an L level to release the counter 22 from a reset state. The counter 22 begins to count pulses. The switch 21a opens and the switch 21b closes. The AND circuit 24, therefore, does not immediately produce an H level output upon receipt of another charge completion signal from the terminal M. The AND circuit 24 produces the H level output after the level of the output Qn of the counter 22 becomes an H level. Then, the AND circuit 18 produces an H level output to permit performance of the distance measuring action and that of the flash light emitting action.

Thus, with the embodiment in the second auxiliary light mode, after an in-focus state is obtained, the flash light emitting action and the distance measuring action are not performed immediately after a charge completion signal is produced. The flash light emitting (or flashing) action and the distance measuring action are thus arranged to be carried out at the end of every period of the timer time of the timer composed of the counter 22. The flashing interval thus becomes longer after the in-focus state is obtained than during a de-focus state, so that electric energy can be prevented from being wasted by unnecessary flashing.

The operation described in the foregoing is for a near-focus state. In the case of a far-focus state, it is the level of the output FF that becomes an H level, i.e. goes high, at the computing circuit 2. Therefore, the AND circuit 8b produces an H level output. The transistors 11c and 11d turn on to cause the motor to rotate in the direction reverse to the rotating direction for the above-stated near-focus state. The rest of the operation is carried out in the same manner as in the case of the near-focus state to bring the lens to an in-focus position. After that, distance measurement is performed with the auxiliary light emitted at intervals defined by the above-stated timer circuit.

In the event that distance measurement is impossible with the lens within a distance unmeasureable range in the second auxiliary light mode, the computing circuit 2 produces all the outputs NF, JF and FF at an L level and also produces the output C at an L level as a result of distance measurement carried out under the auxiliary light illumination with a flash light emitted in response to a charge completion signal. Accordingly, the outputs of the AND circuits 8a and 8b are kept at an L level. Meanwhile, the NOR circuit 14 produces an H level output to render the monostable multivibrator 15 operative. The output L of the monostable multivibrator 15 becomes an H level and remains at the H level for a predetermined period of time. The H level output then causes either the AND circuit 13a or 13b to produce an H level output. As a result of this, the motor 10 rotates either in the direction of arrow or in the direction reverse thereto for the period of time during which the output of the monostable multivibrator 15 remains at the H level. The lens is thus shifted to a predetermined extent by the motor. After the lens is thus shifted to the predetermined extent, the AND circuit 13a or 13b produces an L level output when the output level of the multivibrator 15 becomes low (or L). This brings the motor 10 to a stop. In the meantime, an H level output of the inverter 16 is again impressed on one of the input terminals of the AND circuit 17. At that time, since all the output NF, JF and FF of the computing circuit 2 are produced at an L level, the switch 19 is off and the counter is kept in its initial state despite of the shift of the lens position to the predetermined extent. The output G of the comparator 6 is, therefore, kept at an H level irrespective of the shift of the lens. Therefore, the AND circuit 17 comes to produce an H level output in response to the change of the output level of the monostable multivibrator 15 to the L level.

Further, at this time, since the output JF is at an L level, the analog switch 21b is open. Therefore, the AND circuit 24 produces an H level output in response to a charge completion signal. Then, the AND circuit 18 also produces an H level output to cause the sensor 1 to resume the image signal accumulating action.

With the lens within the distance unmeasurable range, the above-described distance measurement and lens shifting to the predetermined extent are repeated under flash light illumination every time a charge completion signal is produced. This search action is carried out until the lens is shifted to a distance measurable range. During the search action, when the lens is shifted to the distance measurable range coming closer to an in-focus position, the computing circuit 2 detects a near-focus state, an in-focus state or a far-focus state and also a de-focus degree as a result of distance measurement. After that, therefore, the lens is shifted to an in-focus position in the same manner as described in detail in the foregoing description of operation under distance measurable condition.

After arrival of the lens at an in-focus point, the light emission and the distance measuring action are not performed immediately after generation of a charge completion signal when the charge completion signal is generated. These actions are performed in a cycle or at intervals controlled by the timer circuit which is composed of the counter as described in the foregoing.

Next, the operation of the embodiment in a first auxiliary light mode is as follows: In this case, the switch 19 is shifted to the side M1. This brings the AND circuit 24 in a state of producing an H level output solely in response to a charge completion signal. As a result, the distance measuring action and the light emitting action described in the foregoing are arranged to be performed every time a charge completion signal is produced.

In the focusing device according to the invention, as described in the foregoing, the distance measuring action and the flash light emitting action are arranged to be performed every time a charge completion signal is produced under a de-focus condition with the auxiliary light used. Under an in-focus condition on the other hand, the distance measuring action and the flash light emitting action are not allowed to be performed immediately in response to the charge completion signal when it is produced and are arranged to be performed at predetermined intervals. Therefore, after attainment of an in-focus state, consumption of electric energy by the flash device which is an auxiliary light source can be reduced to a great extent.

In the specific embodiment described, a counter is used for the timer circuit. However, this timer circuit, of course, may be replaced with some other suitable timer arrangement, such as a PUT timer circuit using a CR timer.

Further, a flash device is employed as the auxiliary light source in the embodiment shown in FIG. 6. However, an ordinary spot light source is, of course, also usable as the auxiliary light source. In that instance, a trigger circuit may be arranged to trigger the auxiliary light source at predetermined intervals; and the distance measuring action may be accomplished by driving the spot light source with a signal produced from that trigger circuit in place of the above-stated charge completion signal.

The sensor 1 mentioned in the foregoing is arranged to have power supply applied thereto when the output level of the AND gate (or circuit) 18 is high. The accumulating action by the sensor 1 is performed for a predetermined period of time at predetermined time intervals. Meanwhile, a known CCD driver is arranged to drive the sensor to produce the electric charge accumulated there after the lapse of the predetermined period. The embodiment includes a one-shot circuit which operates in response to a signal produced from the known CCD driver indicating completion of the accumulating action of the sensor. The one-shot circuit produces a pulse which, for example, resets the above-stated counter.

Further, the circuit that is arranged to produce the pulses according to the extent of the lens shift and to cause a signal produced from the output terminal E or F of the motor circuit 10 may be arranged in the same manner as disclosed, for example, in U.S. patent application Ser. No. 448,693.

The pulses to be generated according to the extent of the lens shift may be generated by means of some mechanical switch that turns on and off as the motor rotates.

What we claim:
1. An automatic focusing device comprising:
 (a) a focus detecting circuit arranged to repeatedly measure a focus state of an object to be photographed and illuminated with an auxiliary light in response to an illumination start signal which is produced for driving an auxiliary light source, whereby said auxiliary light source is repeatedly actuated for illuminating the object for each focus detecting action;
 (b) lens driving circuit for driving a lens on the basis of detecting results after each focus state detecting action by said focus detecting circuit is completed, said driving circuit driving the lens an amount corresponding to the detection results and stopping the lens, and said focus detecting circuit operating again in synchronism with the illumination start signal while the lens is stopped; and
 (c) an inhibiting circuit arranged to inhibit the actuating action of said illumination start signal on said auxiliary light source when an in-focus is detected by said detecting circuit, whereby a re-starting of said auxiliary light source is inhibited in response to a detection of an in-focus state, thus stopping the repeated illumination.

2. An automatic focusing device for a camera, comprising:
 (a) an auxiliary light source arranged to produce an auxiliary light for illuminating an object to be photographed, said light source illuminating an object for a purpose of enhancing the brightness of the object;
 (b) an illumination start signal forming circuit arranged to repeatedly generate an illumination start signal for repeatedly driving said auxiliary light source, whereby said auxiliary light source is repeatedly actuated;

(c) a focus detecting circuit for repeatedly performing a focus detecting action in response to said illumination start signal, said focus detecting circuit being arranged to produce an in-focus signal when an in-focus state is detected;

(d) a lens driving circuit arranged to drive a lens on the basis of the focus detecting output of said focus detecting circuit after each completion of the focus detecting action of said focus detecting circuit, said driving circuit driving the lens an amount corresponding to the detection results and stopping the lens, and said focus detecting circuit operating again in synchronism with the illumination start signal while the lens is stopped; and (e) an inhibiting circuit for inhibiting operation of said auxiliary light source and said focus detecting circuit in response to the in-focus signal, whereby a re-starting of said auxiliary light source is inhibited in response to a detection of an in-focus state.

3. An automatic focusing device according to claim 2, wherein said auxiliary light source is arranged in a separate unit from said camera.

4. An automatic focusing device which performs focus adjustment under an auxiliary light by repeating illuminations, comprising:

(a) a focus detection circuit for detection of a focus state of an object to be photographed, said circuit being actuated in response to a start signal;

(b) a light emitting light source for irradiating an emitted light onto the object for illuminating on the object, said light source being actuated in response to said start signal;

(c) a lens driving circuit for driving a lens for such an amount as corresponding to a focus detection output detected by said focus detection circuit as the operation of the focus detection circuit is completed, then stopping the driving;

(d) a control circuit for transmitting said start signal to said focus detection circuit and actuating the focus detection action and the light emittance of the light source again in synchronism with the start signal when the lens driving by said lens driving circuit is completed and the lens driving is at a stopped state; and (e) an inhibiting circuit for inhibiting a light emitting action of said light source by said start signal when a focus detection output by said focus detection circuit indicates an in-focus state.

5. An automatic focusing device according to claim 4, wherein said inhibiting circuit inhibits a repeated action of the focus detection circuit by said control circuit is response to the start signal when a focus detection indicates an in-focus state.

6. An automatic focusing device for a camera, comprising:

(a) an auxiliary light source arranged to produce an auxiliary light for illuminating an object to be photographed;

(b) an illumination start signal forming circuit arranged to repeatedly generate an illumination start signal for repeatedly driving said auxiliary light source;

(c) a focus detecting circuit for repeatedly performing a focus detecting action in response to said illumination start signal, said focus detecting circuit being arranged to produce an in-focus signal when an in-focus state is detected;

(d) a lens driving circuit arranged to drive a lens on the basis of the focus detecting output of said focus detecting circuit after completion of the focus detecting action of said focus detecting circuit;

(e) a signal forming circuit arranged to generate a signal at intervals longer than the intervals at which said illumination start signal is generated; and (f) a control circuit responsive to said in-focus signal for causing said auxiliary light source and said focus detecting circuit to be driven by said signal produced from said signal forming circuit instead of being driven by said illumination start signal.

7. An automatic focusing device comprising:

(a) a focus detecting circuit arranged to repeatedly detect an in-focus state of an object to be photographed and illuminated with an auxiliary light in response to an illumination start signal which is repeatedly produced for driving an auxiliary light source;

(b) a lens driving circuit arranged to drive a lens until an in-focus state is detected by said focus detecting circuit; and (c) a control circuit which upon detection of an in-focus state by said focus detecting circuit, causes said focus detecting circuit and said auxiliary light source to operate at intervals longer than the intervals at which said illumination start signal is repeatedly generated.

8. An automatic focusing device for a camera, comprising:

(a) an auxiliary light source arranged to produce an auxiliary light for illuminating an object to be photographed;

(b) an illumination start signal forming circuit arranged to repeatedly generate an illumination start signal for repeatedly driving said auxiliary light source, whereby said auxiliary light source is repeatedly actuated;

(c) a focus detecting circuit for repeatedly performing a focus detecting action in response to said illumination start signal, said focus detecting circuit being arranged to produce an in-focus signal when an in-focus state is detected;

(d) a lens driving circuit arranged to drive a lens on the basis of the focus detecting output of said focus detecting circuit after each completion of the focus detecting action of said focus detecting circuit, said lens driving circuit driving the lens an amount corresponding to the focus detection output obtained by said focus detecting circuit;

(e) first inhibiting means for detecting the operating state of said lens driving circuit and preventing said focus detecting circuit form responding to said illumination start signal during the operation of said lens driving circuit; and (f) second inhibiting means for preventing, in response to the in-focus signal, said illumination start signal from being formed, whereby a re-starting of said auxiliary light source is inhibited in response to a detection of an in-focus state, thus, stopping repeated illuminations.

9. An automatic focusing device comprising:

(a) a detection circuit for detecting a focus state of an object to be photographed repeatedly at a predetermined interval of time;

(b) a driving circuit for driving a lens to an in-focus state on the basis of an output of the focus detection circuit; and (c) a control circuit for rendering longer the detection interval of the focus detection circuit after the in-focus state is attained than before.

10. An automatic focusing device according to claim 9, wherein said driving circuit drives the lens on the basis of the output of the focus detection circuit after the focus detection by the focus detection circuit is completed.

11. An automatic focusing device according to claim 1, wherein said inhibiting circuit inhibits the focus detection operation of the focus detection circuit when the in-focus state is detected.

12. An automatic focusing device according to claim 9, wherein said focus detection circuit performs the detection operation under illumination provided by an auxiliary light source which illuminates the object in synchronism with initiation of the repeated focus detection operation.

13. An automatic focusing device comprising:

(a) a focus detecting circuit for effecting a focus detecting action for an object;

(b) a light source control circuit for actuating a light source when the focus detecting action is being performed by said focus detecting circuit and not actuating the light source the focus detection action is completed;

(c) a driving circuit for driving a lens based on a result of the focus detecting action after a completion of said focus detecting action;

(d) a sequence control circuit for effecting said focus detecting action by the focus detecting circuit and a light projection by said light source control circuit for every focus detecting action in a repeated manner; and (e) an inhibiting circuit for inhibiting a light projection from the light source by said light source control circuit when an in-focus state is detected as a result of said focus detecting action.

* * * * *